United States Patent
Saito et al.

(10) Patent No.: US 12,123,796 B2
(45) Date of Patent: Oct. 22, 2024

(54) DATA GENERATION DEVICE AND DATA GENERATION SYSTEM

(71) Applicants: Yokogawa Electric Corporation, Tokyo (JP); KEIO UNIVERSITY, Tokyo (JP)

(72) Inventors: Yuki Saito, Yokohama (JP); Kouhei Ohnishi, Yokohama (JP); Takahiro Nozaki, Yokohama (JP)

(73) Assignees: Yokogawa Electric Corporation, Musashino (JP); KEIO UNIVERSITY, Tokyo (JP)

( * ) Notice: Subject to any disclaimer, the term of this patent is extended or adjusted under 35 U.S.C. 154(b) by 1023 days.

(21) Appl. No.: 17/052,988

(22) PCT Filed: May 7, 2019

(86) PCT No.: PCT/JP2019/018226
§ 371 (c)(1),
(2) Date: Nov. 4, 2020

(87) PCT Pub. No.: WO2019/216305
PCT Pub. Date: Nov. 14, 2019

(65) Prior Publication Data
US 2021/0239552 A1    Aug. 5, 2021

(30) Foreign Application Priority Data
May 8, 2018    (JP) ................................. 2018-089658

(51) Int. Cl.
*G01L 5/00*    (2006.01)
*G05B 11/01*    (2006.01)

(52) U.S. Cl.
CPC ............... *G01L 5/00* (2013.01); *G05B 11/01* (2013.01)

(58) Field of Classification Search
CPC ............ G05B 15/02; G05B 11/01; G01L 5/00
(Continued)

(56) References Cited

U.S. PATENT DOCUMENTS

2004/0211618 A1* 10/2004 Ogawa .................. B62D 5/046
                                                180/402
2012/0089301 A1* 4/2012 Koizumi ................ B62D 6/002
                                                  701/41
(Continued)

FOREIGN PATENT DOCUMENTS

| EP | 2 980 986 A1 | 2/2016 |
|---|---|---|
| JP | 2949293 B2 * | 9/1999 |

(Continued)

OTHER PUBLICATIONS

Toshiyuki Murakami, et al., "Torque Sensorless Control in Multidegree-of-Freedom Manipulator", IEEE Transactions on Industrial Electronics, Apr. 1993, pp. 259-265, vol. 40, No. 2.

*Primary Examiner* — Ronald D Hartman, Jr.
(74) *Attorney, Agent, or Firm* — Sughrue Mion, PLLC

(57) ABSTRACT

A data generation device includes: a parameter generator; and a reaction force data generator. The parameter generator generates value data based on a signal having a correlation with a driving force. The parameter generator generates velocity data based on a signal representing a response of a member driven by the driving force. The reaction force data generator generates data of a reaction force received by the member from a predetermined object based on the value data and the velocity data.

18 Claims, 8 Drawing Sheets

(58) Field of Classification Search
USPC .......................................................... 700/279
See application file for complete search history.

(56) References Cited

U.S. PATENT DOCUMENTS

| | | | |
|---|---|---|---|
| 2012/0111658 A1* | 5/2012 | Hori | B62D 6/008 |
| | | | 180/446 |
| 2015/0198512 A1 | 7/2015 | Montgomery et al. | |
| 2019/0100241 A1* | 4/2019 | Kudo | B62D 5/006 |
| 2019/0315404 A1* | 10/2019 | Hayashi | B62D 1/286 |
| 2020/0047764 A1* | 2/2020 | Yamashita | B60W 30/18145 |
| 2020/0269906 A1* | 8/2020 | Nakade | B62D 5/0463 |

FOREIGN PATENT DOCUMENTS

| | | | | |
|---|---|---|---|---|
| JP | 2003-262582 A | | 9/2003 | |
| JP | 2004284569 A | * | 10/2004 | |
| JP | 2007-253751 A | | 10/2007 | |
| JP | 2013-254257 A | | 12/2013 | |
| WO | WO-2011013217 A1 | * | 2/2011 | ............. B62D 6/001 |

\* cited by examiner

FIG. 3

| SYMBOL | MEANING | UNIT |
|---|---|---|
| $I$ | ELECTRIC CURRENT | A |
| $\Theta^{res}$ | ANGULAR RESPONSE | rad |
| $T_{load}$ | LOAD TORQUE | Nm |
| $T_{int}$ | INTERNAL INTERFERENCE TORQUE | Nm |
| $T_g$ | GRAVITY TERM | Nm |
| $T_c$ | COULOMB FRICTION | Nm |
| $T_{ext}$ | REACTION TORQUE | Nm |
| $D$ | DYNAMIC FRICTION COEFFICIENT | Nm/rad/s |
| $g_{reac}$ | OBSERVER GAIN | rad/s |
| $K_t$ | TORQUE CONSTANT | Nm/A |
| $J_m$ | INERTIA MOMENT | kgm$^2$ |
| $s$ | LAPLACE OPERATOR | – |

DATA GENERATION DEVICE AND DATA GENERATION SYSTEM

CROSS REFERENCE TO RELATED APPLICATIONS

This application is a National Stage of International Application No. PCT/JP2019/018226 filed May 7, 2019, claiming priority based on Japanese Patent Application No. 2018-089658 filed May 8, 2018, the entire contents of each of which are herein incorporated by reference in their entireties.

TECHNICAL FIELD

The present invention relates to a data generation device and a data generation system.

Priority is claimed on Japanese Patent Application No. 2018-089658, filed May 8, 2018, the content of which is incorporated herein by reference.

BACKGROUND ART

In plants and factories, an electric motor may drive a rotating shaft of a screw provided in a reaction tank to stir a liquid stored in the reaction tank. Also, a method of detecting reaction torque received by the rotating shaft based on an angular response of the rotating shaft is disclosed in Non-Patent Literature 1.

CITATION LIST

Non-Patent Literature

[Non-Patent Literature 1]
T. Murakami, F. Yu, and K. Ohnishi, "Torque sensorless control in multidegree-of-freedom manipulator", IEEE Trans. Ind. Electron., Vol. 40, No. 2, pp. 259-265, April 1993.

SUMMARY OF INVENTION

Technical Problem

A control device for controlling the electric motor installed in a factory or the like needs to proceed to the next process after physical properties of a liquid are sufficiently stable in a stirring process. In case that a screw with a rotating shaft driven by the electric motor stirs the liquid, the rotating shaft receives reaction torque from the liquid. The control device can determine whether or not the physical properties of the liquid have been sufficiently stable based on data of reaction torque that changes in accordance with the physical properties of the liquid.

A conventional data generation device generates data of reaction torque received by a rotating shaft based on the output of a strain gauge (a torque sensor) attached to the rotating shaft driven by an electric motor.

However, because the strain gauge easily deteriorates due to a high temperature, the strain gauge may not be usable depending on an environmental temperature. Also, it may be difficult to attach the strain gauge to the rotating shaft because it is necessary to disassemble the existing equipment so that the strain gauge is attached. In this case, there is a problem that the conventional data generation device cannot generate data of reaction torque and the control device cannot determine whether or not the physical properties of the liquid have been sufficiently stable.

The above-described problem is not limited to a case in which the data generation device generates the data of the reaction torque received by the rotating shaft in a liquid stirring process, and is a common problem when the data generation device generates data of a reaction force received by a member. That is, the conventional data generation device has a problem that the data of the reaction force received by the member cannot be generated unless the strain gauge is used. Also, because the strain gauge needs to be replaced regularly, there is a problem that an opportunity loss occurs due to stopping of the equipment every time an operator replaces the strain gauge.

In view of the above circumstances, an objective of the present invention is to provide a data generation device and a data generation system capable of generating data of a reaction force received by a member without using a strain gauge.

Solution to Problem

One aspect of the present invention is a data generation device including: a parameter generator configured to generate value data based on a signal having a correlation with a driving force and generate velocity data based on a signal representing a response of a member driven by the driving force; and a reaction force data generator configured to generate data of a reaction force received by the member from a predetermined object based on the value data and the velocity data.

According to the above-described configuration, the data generation device can generate data of a reaction force received by a member without using a strain gauge.

The data generation device according to one aspect of the present invention is the data generation device further including: a physical property data generator configured to generate physical property data of the object based on the data of the reaction force.

According to the above-described configuration, the data generation device can generate physical property data of an object without using a strain gauge.

In the data generation device according to one aspect of the present invention, claim 2, the physical property data generator is configured to generate the physical property data by executing a recursive least squares algorithm based on the velocity data, acceleration data generated based on the signal, position data generated based on the signal, and the data of the reaction force.

According to the above-described configuration, the data generation device can generate physical property data based on a value derived from value data generated by the parameter generator and data of a reaction force.

In the data generation device according to one aspect of the present invention, the physical property data includes any one of an inertia coefficient, a viscosity coefficient, and an elasticity coefficient related to the object.

According to the above-described configuration, the data generation device can acquire coefficients representing quality of a product such as an inertia coefficient, a viscosity coefficient, and an elasticity coefficient.

In the data generation device according to one aspect of the present invention, the value data is electric current value data.

According to the above-described configuration, the data generation device can generate data of a reaction force received by a member based on electric current data and velocity data.

According to an aspect of the present invention, the velocity data is angular velocity data.

According to the above-described configuration, the data generation device can generate data of a reaction force received by a member based on value data and angular velocity data.

According to an aspect of the present invention, in the above-described data generation device, the member is a rotating shaft and the data of the reaction force is data of reaction torque.

According to an aspect of the present invention, the above-described data generation device includes a storage configured to store any one of internal interference torque related to the driving force, gravity term torque, and a dynamic friction coefficient as a parameter, wherein the reaction force data generator generates the data of the reaction force based on the value data, a parameter read from the storage, and the velocity data.

According to the above-described configuration, the data generation device can generate data of a reaction force using a parameter and value data that can be obtained by a factory operator performing measurement in advance using equipment of an actual factory or the like.

According to an aspect of the present invention, the above-described data generation device includes a storage configured to store an observer gain of the reaction force data generator, wherein the reaction force data generator derives a first result by multiplying the value data by a torque constant related to the driving force, derives a second result by multiplying the first result by an inertia moment of the member and the observer gain of the reaction force data generator, derives a fourth result by subtracting a third result derived based on the parameter from a result of a sum of the first result and the second result, derives a fifth result by applying a low-pass filter to the fourth result, and derives the data of the reaction force by subtracting the second result from the fifth result.

According to the above-described configuration, the data generation device can derive data of a reaction force based on value data and a parameter using an observer included in the reaction data generator.

According to an aspect of the present invention, in the above-described data generation device, the parameter generator derives the velocity data by integrating values obtained by subtracting load torque received by the driving force from values obtained by multiplying the value data by a torque constant related to the driving force.

According to the above-described configuration, because the data generation device can derive velocity data by integrating values obtained by subtracting load torque from values obtained by multiplying value data by a torque constant, it is possible to obtain velocity data without providing a sensor for measuring a velocity of a driving force.

According to an aspect of the present invention, in the above-described data generation device, the data generation device transmits the data of the reaction force to a higher-order control device including a controller configured to execute control based on the data of the reaction force.

According to the above-described configuration, the data generation device can transmit generated data of a reaction force to the higher-order control device, thereby implementing control of a driving force.

According to the above-described configuration, the data generation device can generate data of reaction torque received by a rotating shaft based on value data and velocity data.

According to an aspect of the present invention, there is provided a data generation system including a data generation device for generating data and a higher-order control device, wherein the data generation device includes a parameter generator configured to generate value data based on a signal having a correlation with a driving force and generate velocity data based on a signal representing a response of a member driven by the driving force; a reaction force data generator configured to generate data of a reaction force received by the member from a predetermined object based on the value data and the velocity data; and a first communicator configured to transmit the data of the reaction force and wherein the higher-order control device includes a second communicator configured to receive the data of the reaction force; and a controller configured to execute control based on the received data of the reaction force.

According to the above-described configuration, the data generation system can execute control based on data of a reaction force received by a member without using a strain gauge.

According to an aspect of the present invention, in the above-described data generation system, the controller outputs a control signal for stopping the driving force in case that the data of the reaction force converges within a range from a predetermined upper limit to a lower limit.

According to the above-described configuration, because the data generation system can end a current process and proceed to the next process in the step in which the acquisition of desired physical property data has been achieved, it is possible to reduce an ineffective operation of continuing the process for a long time.

According to an aspect of the present invention, the above-described data generation system includes a storage configured to store any one of internal interference torque related to the driving force, gravity term torque, and a dynamic friction coefficient as a parameter, wherein the reaction force data generator generates the data of the reaction force based on the value data, a parameter read from the storage, and the velocity data.

According to the above-described configuration, the data generation system can generate data of a reaction force using a parameter and value data that can be obtained by a factory operator performing measurement in advance using equipment of an actual factory or the like.

According to an aspect of the present invention, the above-described data generation system includes a storage configured to store an observer gain of the reaction force data generator, wherein the reaction force data generator derives a first result by multiplying the value data by a torque constant related to the driving force, derives a second result by multiplying the first result by an inertia moment of the member and the observer gain of the reaction force data generator, derives a fourth result by subtracting a third result derived based on the parameter from a result of a sum of the first result and the second result, derives a fifth result by applying a low-pass filter to the fourth result, and derives the data of the reaction force by subtracting the second result from the fifth result.

According to the above-described configuration, the data generation system can derive data of a reaction force based on value data and a parameter using an observer included in the reaction data generator.

According to an aspect of the present invention, in the above-described data generation system, the parameter generator derives the velocity data by integrating values obtained by subtracting load torque received by the driving force from values obtained by multiplying the value data by a torque constant related to the driving force.

According to the above-described configuration, because the data generation system can derive velocity data by integrating values obtained by subtracting load torque from values obtained by multiplying value data by a torque constant, it is possible to obtain velocity data without providing a sensor for measuring a velocity of a driving force.

According to an aspect of the present invention, in the above-described data generation system, the data generation device further includes a physical property data generator configured to generate physical property data of the object based on the data of the reaction force, the first communicator transmits the physical property data, the second communicator receives the physical property data, and the controller executes control based on the received physical property data.

According to the above-described configuration, the data generation system can execute control based on physical property data of an object without using a strain gauge.

According to an aspect of the present invention, in the above-described data generation system, the controller outputs a control signal for controlling the driving force so that a difference between the received physical property data and predetermined physical property data is reduced.

According to the above-described configuration, the data generation system can adjust quality of a product so that the acquisition of desired physical property data is achieved while the product is being manufactured.

According to an aspect of the present invention, in the above-described data generation system, the physical property data generator generates the physical property data by executing a recursive least squares algorithm based on the velocity data, acceleration data generated based on a signal representing a response of a member driven by the driving force, position data generated based on a signal representing a response of a member driven by the driving force, and the data of the reaction force.

According to the above-described configuration, it is possible to generate physical property data based on a value derived from value data generated by the parameter generator and data of a reaction force.

According to an aspect of the present invention, in the above-described data generation system, the physical property data includes any one of an inertia coefficient, a viscosity coefficient, and an elasticity coefficient related to the object.

According to the above-described configuration, it is possible to acquire coefficients representing quality of a product such as an inertia coefficient, a viscosity coefficient, and an elasticity coefficient.

Advantageous Effects of Invention

According to the present invention, it is possible to generate data of a reaction force received by a member without using a strain gauge.

BRIEF DESCRIPTION OF DRAWINGS

FIG. 3 is a diagram showing a list of symbols according to the first embodiment.

DESCRIPTION OF EMBODIMENTS

Embodiments of the present invention will be described in detail with reference to the drawings.

First Embodiment

Figure 1:
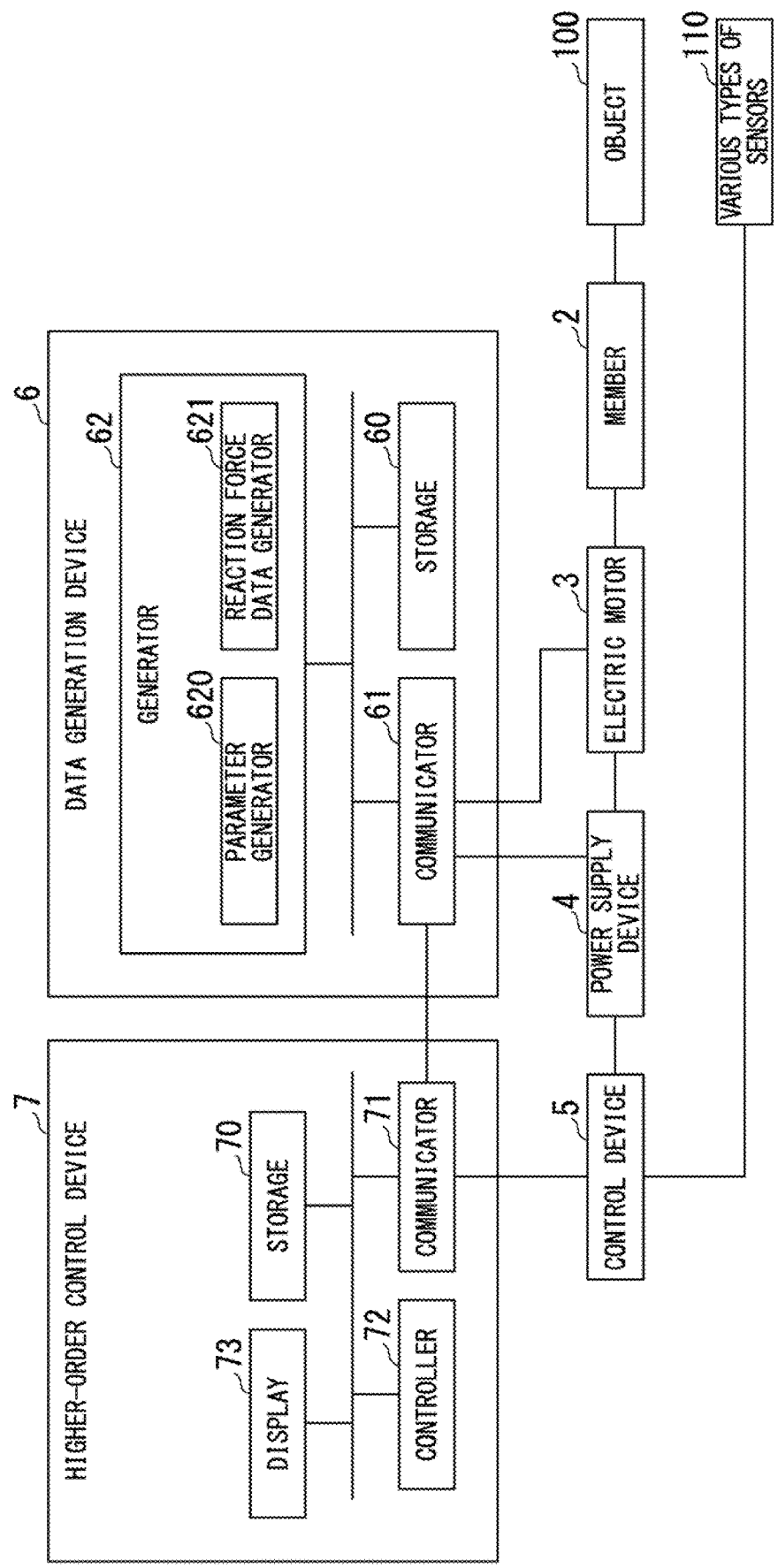
FIG. 1 is a diagram showing an example of a configuration of a data generation system according to a first embodiment.

FIG. 1 is a diagram showing an example of a configuration of a data generation system 1. The data generation system 1 is a system for generating data such as physical quantity data. The data generation system 1 is provided in, for example, a plant, a factory, or the like. The data generation system 1 includes a member 2, an electric motor 3, a power supply device 4, a control device 5, a data generation device 6, and a higher-order control device 7.

The member 2 is a member provided in mechanical equipment such as a screw, a pump, a press machine, an injection molding processing machine, a robot arm, a drill system, a polishing machine, a machine tool, or a mounting machine (a mounter), and is, for example, a rotating shaft or a slider. The member 2 is driven by an electric motor 3. For example, in case that the member 2 is a rotating shaft, an angular response (a rotation angle) of the member 2 changes due to driving by the electric motor 3. For example, in case that the member 2 is a slider, the member 2 moves in a predetermined direction according to driving by the electric motor 3.

The member 2 applies a force to an object 100 which is a predetermined object according to driving by the electric motor 3. In case that the mechanical equipment is a screw or a pump, the object 100 is, for example, a liquid stored in a reaction tank. In case that the mechanical equipment is a mounting machine, the object 100 is, for example, a printed circuit board. The member 2 receives a reaction force from the object 100. For example, in case that the member 2 is a rotating shaft, the rotating member 2 receives reaction torque from the object 100.

The electric motor 3 (an actuator) is a device that operates in accordance with electric power supplied from the power supply device 4. The electric motor 3 drives the member 2 in accordance with the supplied power, i.e., an electric current and a voltage. The driving force of the electric motor 3 has a correlation with a value representing the electric current supplied to the electric motor 3 (an electric current value I). For example, driving torque (Nm) serving as a driving force is expressed by a result of multiplying the electric current value I (A) by a torque constant $K_t$ (Nm/A).

The electric motor 3 outputs a signal representing a response (hereinafter referred to as a "response signal") to the data generation device 6 with respect to the response of the member 2 that has received the driving force. In case that the member 2 is a rotating shaft, the response signal is, for example, a signal corresponding to, for example, an angle (rad), an angular velocity (a rotational velocity) (rad/s), and angular acceleration (rad/s$^2$) of the member 2 which rotates. In case that the member 2 is a slider, the response signal is, for example, a signal corresponding to a position (m), a velocity (m/s), and acceleration (m/s$^2$) of the member 2 which moves.

The response signal may be a digital signal or an analog signal. For example, in case that the electric motor 3 includes an encoder, the electric motor 3 outputs a digital signal corresponding to a position or an angular response of the member 2 as a response signal to the data generation device 6. For example, in case that the electric motor 3 includes a Hall sensor, the electric motor 3 outputs an analog signal (a waveform signal) according to the position or the angular response of the member 2 as the response signal to the data generation device 6.

The power supply device 4 is a device that supplies electric power, and is, for example, an inverter, a motor driver, or a three-phase power supply. The power supply device 4 acquires, for example, a set value of an electric current, a driving force, or driving torque from the control device 5. The power supply device 4 supplies the electric power represented by the acquired set value to the electric motor 3.

The power supply device 4 transmits a signal having a correlation with the driving force of the electric motor 3 (hereinafter referred to as a "driving force signal") to the data generation device 6. The driving force signal of the electric motor 3 is, for example, a signal representing a measured value or a set value of the electric current supplied to the electric motor 3, a signal representing a set value of the driving force of the electric motor 3, or a signal representing a set value of the driving torque. The driving force signal may be a digital signal or an analog signal.

The control device 5 is a device that controls the power supply device 4, and is, for example, a programmable logic controller (PLC). The control device 5 acquires a control signal representing an electric current value, a driving timing, or the like from the higher-order control device 7. The control signal is, for example, a signal representing ON or OFF, a signal representing a driving timing, or a signal representing a set value such as an electric current or a velocity. The control device 5 outputs a set value such as an electric current or a velocity to the power supply device 4 in accordance with the control signal. The control device 5 reads physical quantity data of various types of sensors 110 connected to the control device 5, for example, a temperature sensor, a pressure sensor, a flow rate sensor, and the like. For example, the control device 5 reads the physical quantity data of the object 100 and transmits the physical quantity data to the communicator 71.

The data generation device 6 is an information processing device that generates data. The data generation device 6 includes a storage 60, a communicator 61, and a generator 62. The storage 60, the communicator 61, and the generator 62 are provided in a control device such as a PLC.

For example, the communicator 61 and the generator 62 are implemented by a processor such as a central processing unit (CPU) executing a program (library). This program may be a program of an application that operates on an operating system, for example, a program of an application that operates on a real-time operating system. For example, the communicator 61 and the generator 62 may be implemented using hardware such as a large-scale integration (LSI) circuit and an application specific integrated circuit (ASIC). The communicator 61 and the generator 62 may be implemented as a hardware module of a control device such as a PLC.

The storage 60 is a non-volatile storage device (a non-transitory recording medium) such as a flash memory. The storage 60 stores programs to be executed by the communicator 61 and the generator 62. The storage 60 may further include a volatile recording medium such as a random-access memory (RAM).

The communicator 61 (a first communicator) receives a driving force signal from the power supply device 4. The communicator 61 receives a response signal from the electric motor 3. The communicator 61 records data included in the driving force signal and data included in the response signal in the storage 60 in association with a time. Also, in case that the communicator 61 has received the analog signal, the communicator 61 converts the received analog signal into a digital signal and records the digital signal as a conversion result in the storage 60.

The communicator 61 receives a response signal measured with respect to the object 100 from the electric motor 3 via the member 2. The communicator 61 records the response signal measured with respect to the object 100 in the storage 60 in association with the time.

The communicator 61 acquires physical quantity data such as reaction force data generated by the generator 62 from the generator 62. The communicator 61 transmits physical quantity data such as reaction force data to the higher-order control device 7.

The generator 62 is a functional unit that generates data such as reaction force data. The generator 62 includes a parameter generator 620 and a reaction force data generator 621. The parameter generator 620 acquires a driving force signal from the storage 60 or the communicator 61. The parameter generator 620 generates value data based on the driving force signal. For example, in case that the driving force signal which is a digital signal includes electric current value data, the parameter generator 620 acquires the electric current value data from the driving force signal. For example, in case that the driving force signal, which is an analog signal, represents an electric current waveform, the parameter generator 620 generates electric current value data based on the electric current waveform represented by the driving force signal.

The parameter generator 620 acquires the response signal from the storage 60 or the communicator 61. The parameter generator 620 generates velocity data of the member 2 based on the response signal. The parameter generator 620 acquires velocity data from the response signal in case that the response signal, which is a digital signal, includes velocity data.

In case that the response signal, which is an analog signal, represents a waveform according to a position of the member 2, the parameter generator 620 generates time-series position data based on the response signal. The parameter generator 620 generates velocity data of the member 2 which moves based on the time-series position data.

In case that the response signal, which is an analog signal, represents a waveform according to the angle of the member 2, the parameter generator 620 generates time-series angle data based on the response signal. The parameter generator 620 generates data of the angular velocity (the rotational velocity) of the member 2 which rotates based on the time-series angle data.

The reaction force data generator 621 is an observer that estimates the reaction force received by the member 2. The reaction force data generator 621 generates data of the reaction force received by the member 2 from the object 100 based on the value data and the velocity data.

Figure 2:
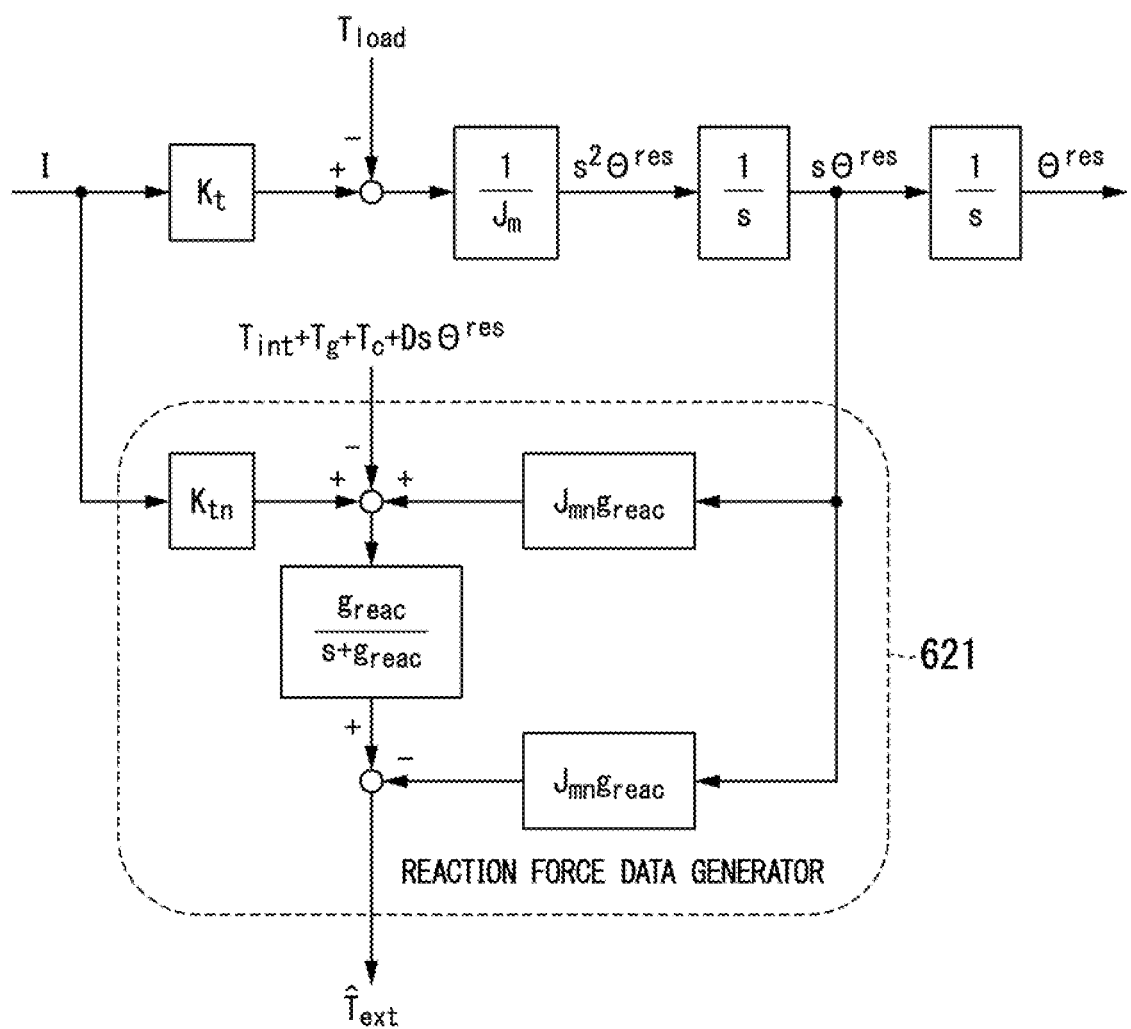
FIG. 2 is a diagram showing an example of a process of generating data of a reaction force according to the first embodiment.

FIG. 2 is a diagram showing an example of a process of generating data of a reaction force. Also, FIG. 3 is a diagram showing a list of symbols shown in FIG. 2. In FIG. 2, the member 2 is a rotating shaft as an example. In the following, a mark "^" written above a character in the mathematical expression shown in FIG. 3 is written immediately before the character in the description. Here, "^" denotes an estimate.

A result of multiplying the electric current value I which is the measured value or the set value by the torque constant $K_t$ at time t represents the driving torque which is the driving force in the rotation direction at time t. A result of multiplying a result of subtracting load torque $T_{load}$ from the driving torque by a reciprocal of an inertia moment $J_m$ represents angular acceleration ($s^2\Theta^{res}$) of the member 2 that rotates in response to the driving torque. A result of executing an integration process on the angular acceleration ($s^2\Theta^{res}$), i.e., a result of multiplying the angular acceleration by a reciprocal of a Laplace operator, represents an angular velocity ($s^2\Theta^{res}$) of the member 2. A result of executing an integration process on the angular velocity ($s^2\Theta^{res}$), i.e., a result of multiplying the angular velocity by the reciprocal of the Laplace operator, represents the angle ($\Theta^{res}$) of the member 2.

The load torque $T_{load}$ is represented as "$T_{load}=T_{int}+T_g+T_c+Ds\Theta^{res}+T_{ext}$" using internal interference torque $T_{int}$, gravity term torque $T_g$, Coulomb friction torque $T_c$, a dynamic friction coefficient D, a Laplace operator s, an angle $\Theta^{res}$, and reaction torque $T_{ext}$.

An operator of a factory or the like measures parameters of the load torque $T_{load}$, the internal interference torque $T_{int}$, the gravity term torque $T_g$, and the dynamic friction coefficient D in advance using equipment of an actual factory or the like. The operator of the factory or the like may measure a result of summing a plurality of parameters (for example, "$T_{int}+T_g+T_c$") instead of individually measuring these parameters. These parameters measured in advance are stored in the storage 60. An observer gain $g_{reac}$ is a set value and is determined to be a value greater than a frequency of estimated reaction torque, for example, using a reciprocal of a control period as a theoretical upper limit value. The observer gain $g_{reac}$ is stored in the storage 60.

The reaction force data generator 621 acquires the parameters ($T_{int}$, $T_g$, and $T_c$) and the observer gain $g_{reac}$ measured in advance using equipment of an actual factory or the like from the storage 60. The reaction force data generator 621 acquires the value data and the velocity data from the storage 60 or the communicator 61. In FIG. 2, the reaction force data generator 621 acquires the electric current value I, which is value data, and the angular velocity data (sores), which is velocity data, from the storage 60 or the communicator 61.

The reaction force data generator 621 multiplies the electric current value I by the torque constant $K_t$. Hereinafter, this multiplication result is referred to as a "first result". The reaction force data generator 621 multiplies the inertia moment $J_m$ by the observer gain $g_{reac}$ and the angular velocity data (sores). Hereinafter, this multiplication result is referred to as a "second result". The reaction force data generator 621 calculates "$T_{int}+T_g+T_c+Ds\Theta^{res}$". Hereinafter, this calculation result is referred to as a "third result".

The reaction force data generator 621 subtracts the third result from a result of summing the first result and the second result. Hereinafter, this subtraction result is referred to as a "fourth result". The reaction force data generator 621 multiplies the fourth result by "$g_{reac}/(s+g_{reac})$" which is a low-pass filter. Hereinafter, this multiplication result will be referred to as a "fifth result".

The reaction force data generator 621 subtracts the second result from the fifth result. This subtraction result becomes an estimate of the reaction torque $T_{ext}$. In this manner, the reaction force data generator 621 generates the data of the estimated reaction torque $\hat{T}_{ext}$ as reaction force data.

Returning to FIG. 1, the description of the configuration example of the data generation system 1 will be continued. In a factory or the like in which the data generation system 1 is installed, the control device 5 individually controls the equipment, while the higher-order control device 7 generally controls equipment of the factory or the like. The higher-order control device 7 is an information processing device that performs higher control on the control device 5, and is, for example, a personal computer or a workstation.

The higher-order control device 7 includes a storage 70, a communicator 71, a controller 72, and a display 73. The communicator 71 and the controller 72 are implemented by a processor such as a CPU executing a program stored in the storage 70.

The storage 70 is a non-volatile storage device (a non-transitory recording medium) such as a flash memory. The storage 70 stores a program executed by the controller 72. This program is a program for controlling equipment such as the power supply device 4 and the electric motor 3. The storage 70 may store various types of set values (threshold values) such as a reaction force and a temperature. The storage 70 may further include a volatile recording medium such as a RAM.

The communicator 71 (a second communicator) communicates with the control device 5. For example, the communicator 71 receives physical data such as temperature data, pressure data, and flow rate data of the object 100 from the control device 5. For example, the communicator 71 transmits a control signal generated by the controller 72 to the control device 5. The communicator 71 communicates with the data generation device 6. For example, the communicator 71 receives the physical quantity data from the data generation device 6. The physical quantity data is, for example, reaction force data of reaction torque or the like received by the member 2, position data such as angle data of the member 2, velocity data such as angular velocity data of the member 2, or acceleration data such as angular acceleration data of the member 2.

The controller 72 acquires physical quantity data such as temperature data and reaction force data from the communicator 71. The controller 72 executes control in accordance with the acquired physical quantity data. For example, the controller 72 causes the display 73 to display a temperature trend graph (a temperature curve image) and a reaction force data trend graph (a reaction force curve image) in accordance with the acquired physical quantity data. For example, in case that the temperature data is included in the range determined by the upper limit and the lower limit of the temperature setting value, the controller 72 causes the display 73 to display a message image representing that a temperature adjustment process in the stirring process of the object 100 has ended.

Figure 4:
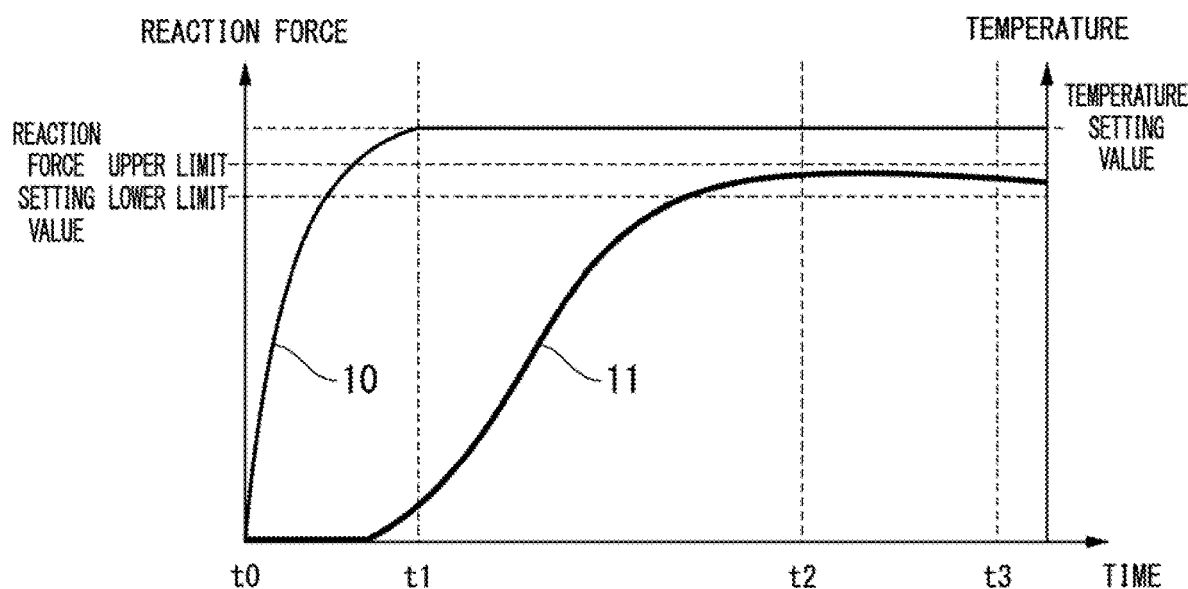
FIG. 4 is a diagram showing a first example of a trend graph according to the first embodiment.

FIG. 4 is a diagram showing a first example of a trend graph. The horizontal axis represents time. The left vertical axis represents a reaction force such as reaction torque. The right vertical axis shows a temperature. A temperature curve 10 is a temperature trend graph. A reaction force curve 11 is a reaction force trend graph. A period from time to t0 time t1 is a temperature adjustment time period. The period from time t1 to time t2 is a time period for waiting for the progress of the reaction of the object 100. In case that the object 100 is a liquid, a reaction in which the physical properties of the object 100 change progresses by stirring the object 100. As the physical properties change, the reaction force received by the member 2 changes. The reaction in the object 100 is stable, so that the physical properties of the object 100 are stable and a physical quantity such as the reaction force received by the member 2 settles down to a constant value.

The conventional higher-order control device only controls the temperature of the object and the rotational velocity of the member of the electric motor and does not measure the physical property data (for example, inertia data, viscosity data, and elasticity data) of the object. The conventional higher-order control device estimates the physical property data of the object based on a temperature of the object and a time period such as a stirring time period. If the process ends before the reaction of the object is stable, the physical properties of the object become poor. Therefore, the conventional higher-order control device needs to lengthen a time period of the process. In FIG. 4, the conventional higher-order control device needs to continue the stirring process until time t3, even though the reaction of the object is completed at time t2 in case that the reaction force reaches a reaction force setting value.

The higher-order control device 7 detects the physical properties of the object 100 based on the reaction force data having a correlation with the physical property data of the object 100 in the process. Thereby, the higher-order control device 7 can detect time t2 at which the reaction of the object 100 is stable based on the reaction force data of the object 100. Because the higher-order control device 7 can proceed to the next process, for example, at time t2, it is possible to reduce an ineffective operation of continuing the current process for a long time until time t3.

The higher-order control device 7 shortens a manufacturing time period per lot for products using the object 100 by reducing the ineffective operation of continuing the process for a long time. If the manufacturing time period per lot can be reduced from 4 hours to 3 hours, for example, the higher-order control device 7 can increase the number of manufacturing lots for 24 hours from 6 to 8. Thereby, the higher-order control device 7 can improve the efficiency of manufacturing products using the object 100. Because the higher-order control device 7 operates the electric motor 3 and the like for a required time period, it is possible to reduce power consumption.

The controller 72 may generate a control signal in accordance with the physical quantity data acquired from the data generation device 6. For example, in case that the value of the reaction force data converges in the range from the upper limit to the lower limit of the reaction force setting value in the stirring process, the controller 72 may generate the control signal for use in the next process (for example, a chemical input process). For example, in case that the value of the reaction force data converges in the range from the upper limit to the lower limit of the reaction force setting value in the stirring process, the controller 72 may generate a control signal for turning off the rotation of the member 2 so that the stirring process ends. Also, for example, in case that the physical quantity data such as the temperature data, the pressure data, or the flow rate data is within a predetermined range in the stirring process, the controller 72 may generate a control signal for use in the next process (for example, a chemical input process). For example, in case that physical quantity data such as temperature data, pressure data, or flow rate data is within a predetermined range in the stirring process, the controller 72 may generate a control signal for turning off the rotation of the member 2 so that the stirring process ends.

Figure 5:
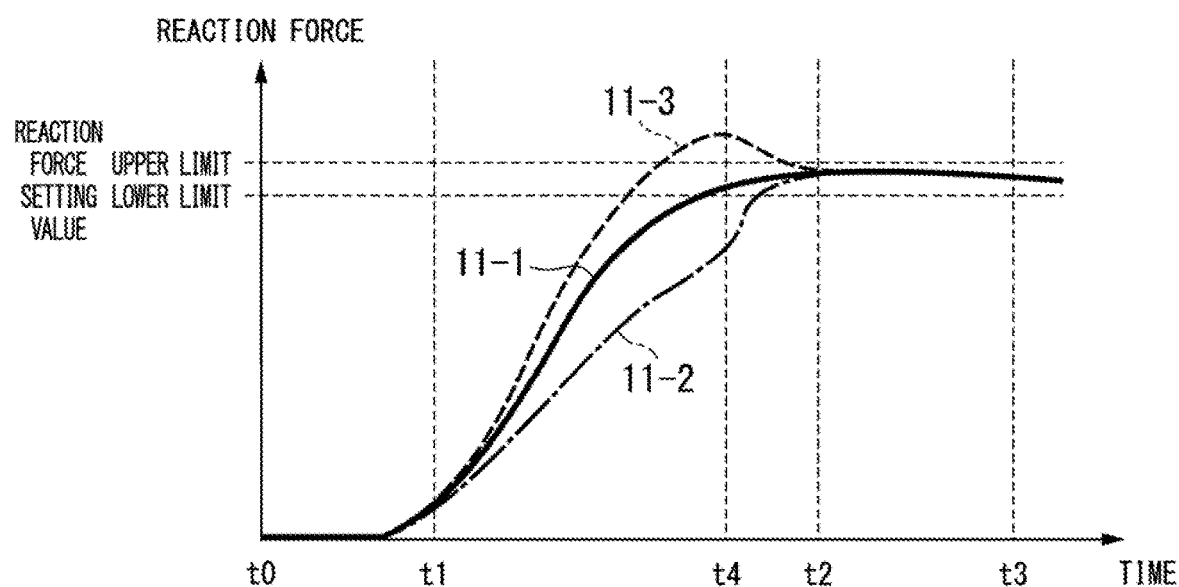
FIG. 5 is a diagram showing a second example of a trend graph according to the first embodiment.

FIG. 5 is a diagram showing a second example of the trend graph. The horizontal axis represents time. The left vertical axis shows a reaction force. The controller 72 acquires physical quantity data from the data generation device 6 at predetermined time intervals. The controller 72 calculates a difference between physical quantity data in a trend graph (a physical quantity data curve) predetermined based on the physical quantity data measured with respect to the object 100 and acquired physical quantity data at predetermined time intervals. In case that the calculated difference is greater than or equal to the threshold value, the controller 72 generates the control signal so that the calculated difference is reduced.

In FIG. 5, the controller 72 acquires reaction force data as an example of the physical quantity data. For example, the controller 72 calculates a difference between a reaction force curve 11-1 predetermined based on the measured value of the reaction force data received by the member 2 from the object 100 and a reaction force curve 11-2 of the acquired reaction force data at predetermined time intervals. The controller 72 generates a control signal for changing the rotational velocity of the member 2 at time t4 so that the calculated difference is reduced. For example, the controller 72 calculates a difference between the reaction force curve 11-1 predetermined based on the measured value of the data of the reaction force received by the member 2 from the object 100 and a reaction force curve 11-3 of the acquired reaction force data at predetermined time intervals.

The controller 72 generates a control signal for changing the rotational velocity of the member 2 at time t4 so that the calculated difference is reduced. The controller 72 may generate a control signal for changing an amount of material or chemical input. That is, the controller 72 adjusts a parameter value by feeding back a difference to the parameter value included in the control signal so that the difference between the reaction force curve 11-1 at a normal time and the reaction force curve 11-2 or 11-3 at an abnormal time is reduced.

In case that the estimated reaction force data is lower than the range from the upper limit to the lower limit of the reaction force setting value at time t4 as in the reaction force curve 11-2, the controller 72 generates, for example, a control signal for increasing a velocity of the member 2 of the electric motor 3. The controller 72 transmits a control signal for increasing the velocity of the member 2 to the control device 5 via the communicator 71. The control device 5 generates an electric current setting value for increasing the amount of electric current based on the control signal for increasing the velocity of the member 2 and transmits the electric current setting value to the power supply device 4. The power supply device 4 supplies an electric current to the electric motor 3 based on an electric current setting value for increasing the amount of electric current. The electric motor 3 increases the velocity of the mechanism and the velocity of the member 2 connected to the mechanism as the electric current supplied from the power supply device 4 increases.

In case that the estimated reaction force data is higher than the range from the upper limit to the lower limit of the reaction force setting value at time t4 as in the reaction force curve 11-3, the controller 72 generates, for example, a control signal for decreasing the velocity of the member 2 of the electric motor 3. The controller 72 transmits a control signal for decreasing the velocity of the member 2 to the control device 5 via the communicator 71. The control device 5 generates an electric current setting value for reducing the amount of electric current based on a control signal for decreasing the velocity of the member 2 and transmits the electric current setting value to the power supply device 4. The power supply device 4 supplies an electric current to the electric motor 3 based on an electric current setting value for reducing the amount of electric current. The electric motor 3 decreases the velocity of the mechanism and the velocity of the member 2 connected to the mechanism as the electric current supplied from the power supply device 4 decreases.

Thereby, the controller 72 can adjust the quality of the product during the manufacturing of the product. In FIG. 5, from time t2 after time t4, the controller 72 can cause the value of the reaction force data within the range from the upper limit to the lower limit of the reaction force setting value to converge. The controller 72 can bring the quality of the product using the object 100 within the standard even if a purchase destination or a production place of the object 100 has changed. The controller 72 can prevent a yield rate of products using the object 100 from decreasing.

The controller 72 may draw a calibration curve on a data group of adjustment items, a reaction conversion rate, a freezing point, a softening point, a molecular weight, and the like determined by a manufacturer based on physical quantity data in a trend graph of the physical quantity data, thereby providing a user with information useful for manufacturing.

The display 73 is an image display device such as a cathode ray tube (CRT) display, a liquid crystal display, and an organic electro luminescence (EL) display. The display 73 displays a temperature trend graph and a reaction force data trend graph, for example, as shown in FIG. 4. The display 73 displays a temperature trend graph, for example, as shown in FIG. 5.

In case that there is a correlation between the quality of the product that uses the object 100 and the physical property data of the object 100, the factory operator can compare normal-time trend data and abnormal-time trend data on a screen with respect to reaction force data or the like having a correlation with physical property data.

Next, an example of an operation of the data generation system 1 will be described.

Figure 6:
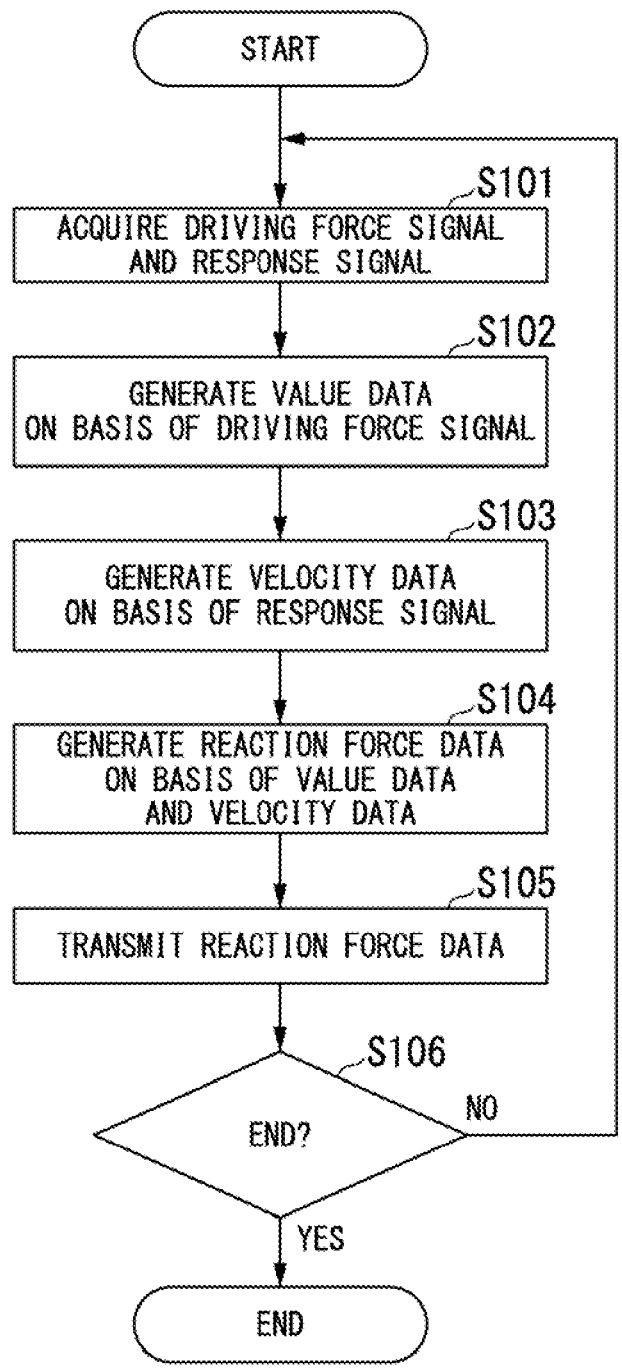
FIG. 6 is a diagram showing an example of an operation of a data generation system according to the first embodiment.

FIG. 6 is a diagram showing the example of the operation of the data generation system 1. The communicator 61 acquires a driving force signal from the power supply device 4. The communicator 61 acquires a response signal from the electric motor 3 (step S101). The parameter generator 620 generates value data based on the driving force signal (step S102).

The parameter generator 620 generates velocity data based on the response signal (step S103). The reaction force data generator 621 generates data of a reaction force such as reaction torque based on the value data and the velocity data (step S104). The communicator 61 transmits the data of the reaction force to the higher-order control device 7 (step S105).

The parameter generator 620 determines whether or not the communicator 61 has received an instruction signal representing the end (step S106). In case that the communicator 61 has not received the instruction signal representing the end (step S106: NO), the parameter generator 620 returns the process to step S101.

In case that the communicator 61 has received the instruction signal representing the end (step S106: YES), the data generation device 6 ends the operation shown in FIG. 6.

As described above, the data generation device 6 of the first embodiment includes the communicator 61, the parameter generator 620, and the reaction force data generator 621. The parameter generator 620 generates value data based on the driving force signal. The parameter generator 620 generates velocity data based on the response signal. The reaction force data generator 621 generates reaction force data based on the value data and the velocity data with respect to the reaction force received by the member 2 from the object 100. The communicator 61 transmits the reaction force data to the communicator 71.

Thereby, the data generation device 6 of the first embodiment can generate data of a reaction force received by the member 2 without using a strain gauge. The higher-order control device 7 of the first embodiment can execute control based on the reaction force data.

The data generation device 6 can generate the data of the reaction force received by the member 2 even if an environmental temperature range is not within a usable range of the strain gauge. Because the operator of the factory does not need to install or replace the strain gauge having a short life as a sensor, the data generation device 6 can reduce a time period in which the operation of the equipment is stopped.

An operator of a factory or the like can check trend graphs of force tactile data such as angle data, angular velocity data, angular acceleration data, and reaction force data. The operator of the factory or the like can efficiently perform the process based on the reaction force data estimated by the data generation device 6 even if the elapsed time in a process such as stirring is not measured.

In case that the mechanical equipment driven by the electric motor 3 is a pump, the data generation device 6 can generate data of a reaction force received by the member 2 from the object 100 which is a target of conveyance of the pump. In case that the physical properties of the object 100 are constant, the operator of the factory or the like can detect a flow rate of the object 100 and a degree of clogging of a conveyance path (a pipe) based on the data of the reaction force received by the member 2.

In case that the mechanical equipment driven by the electric motor 3 is an injection molding processing machine, the data generation device 6 can generate the data of the reaction force received by the member 2 which is an extruding member of the injection molding processing machine. Because the operator of the factory can monitor a filling rate of a material and the like based on the data of the reaction force received by the member 2, it is possible to stabilize the quality of the product using the object 100. An operator of a factory or the like can improve the yield of products. An operator of a factory or the like can predict deterioration of parts (for example, bearings) of mechanical equipment such as the electric motor 3 based on a trend graph of the data of the reaction force received by the member 2 before the mechanical equipment fails and stops. The operator of the factory or the like can improve an operating rate of mechanical equipment installed in the factory or the like.

The data generation device 6 can generate the data of the reaction force received by the member 2 in case that the mechanical equipment driven by the electric motor 3 is a drill system, a grinder, a machine tool, or a mounting machine. The higher-order control device 7 can cause the member 2, which is the rotating shaft of the drill system, to rotate at an optimum angular velocity based on the reaction force data. The higher-order control device 7 can cause the member 2 of the polishing machine to be operated at an optimum pressing pressure based on the reaction force data. The higher-order control device 7 can cause the member 2, which is a conveyance unit of the machine tool, to be moved at an optimum velocity based on the reaction force data. The higher-order control device 7 can mount delicate parts on the printed circuit board using the member 2, which is a robot arm of the mounting machine, based on the reaction force data.

The data generation device 6 can execute the process in a short time period. The data generation device 6 can cause the quality of the product using the object 100 to be stabilized. The data generation device 6 can reduce the risk of component destruction. The data generation device 6 can prevent a yield rate of products using the object 100 from decreasing.

Second Embodiment

A second embodiment is different from the first embodiment in that a data generation device 6 generates physical property data. In the second embodiment, differences from the first embodiment will be described.

Figure 7:
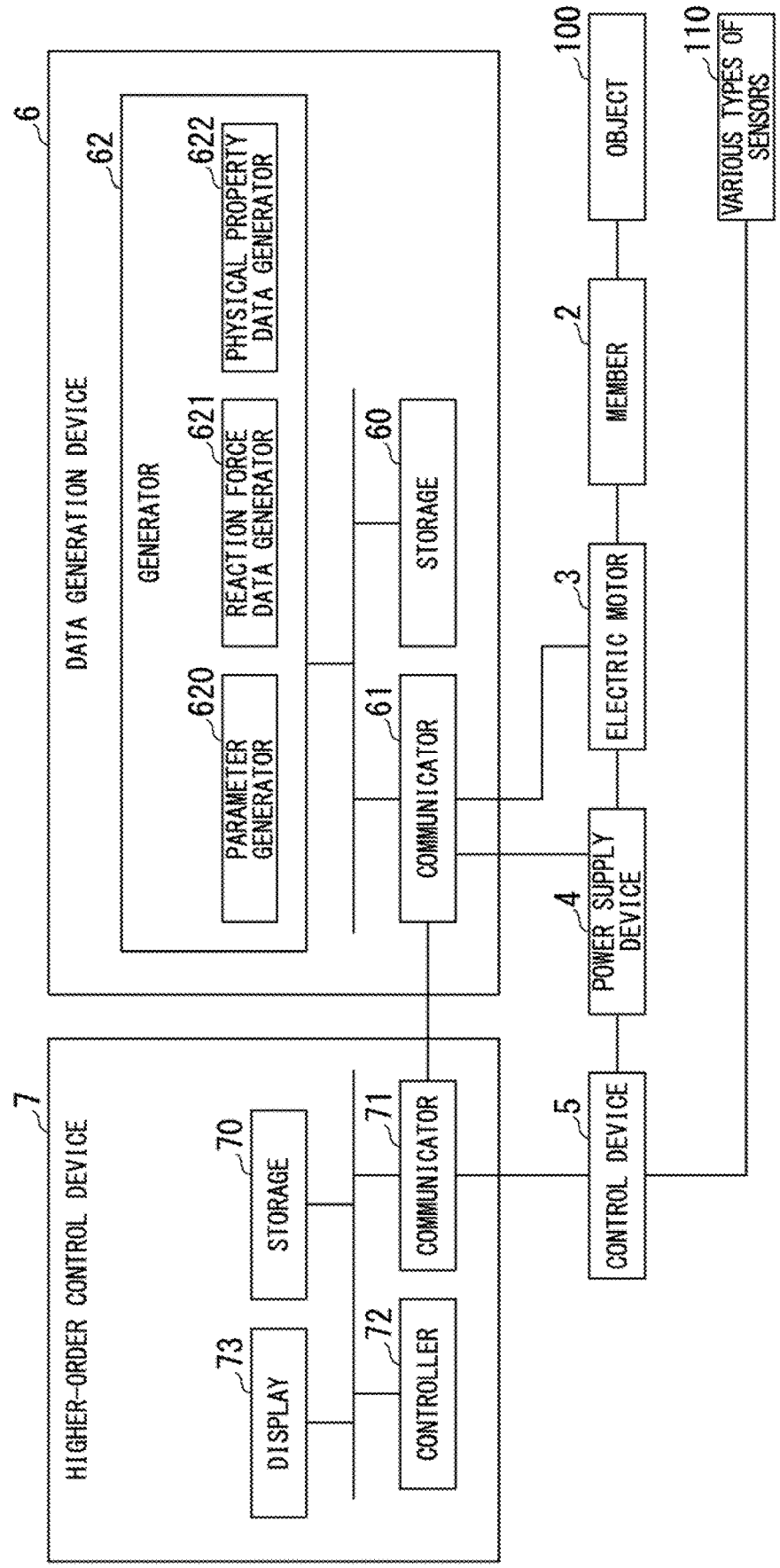
FIG. 7 is a diagram showing an example of a configuration of a data generation system according to a second embodiment.

FIG. 7 is a diagram showing an example of a configuration of a data generation system 1. The data generation device 6 includes a storage 60, a communicator 61, and a generator 62. The generator 62 includes a parameter generator 620, a reaction force data generator 621, and a physical property data generator 622. The storage 60 stores model data representing a physical model of an object 100.

The physical property data generator 622 executes a recursive least squares algorithm (modelized statistical analysis) using physical quantity data such as reaction force data and the physical model of the object 100. Thereby, the physical property data generator 622 generates physical property data (for example, inertia data, viscosity data, and elasticity data) of the object 100.

A general equation of the recursive least squares algorithm is expressed by Eqs. (1) to (4). Hereinafter, a subscript N denotes $N^{th}$ data and a calculation result.

[Math. 1]

$$\hat{\theta}_N = \hat{\theta}_{N-1} + L_N \varepsilon_N \tag{1}$$

[Math. 2]

$$\varepsilon_N = y_N - z_N^T \hat{\theta}_{N-1} \tag{2}$$

[Math. 3]

$$L_N = \frac{P_{N-1} z_N}{\rho_N + z_N^T P_{N-1} z_N} \tag{3}$$

[Math. 4]

$$P_N = \frac{1}{\rho_N} \left[ P_{N-1} - \frac{P_{N-1} z_N z_N^T P_{N-1}}{\rho_N + z_N^T P_{N-1} z_N} \right] \tag{4}$$

A physical model represented by Eq. (5) is, for example, a physical model representing reaction torque received by the member 2 in case that the member 2, which is a rotating shaft, stirs the object 100 which is a liquid.

[Math. 5]

$$T_{ext} = Ms^2\Theta + Bs\Theta + K\Theta + \text{Const} \tag{5}$$

Here, $T_{ext}$ denotes reaction torque. M denotes an inertia coefficient. $s^2\Theta$ denotes angular acceleration. B denotes a viscosity coefficient. $s\Theta$ denotes an angular velocity. K denotes an elasticity coefficient. $\Theta$ denotes an angle. Const denotes a constant term.

The physical property data generator 622 applies the inertia coefficient M, the viscosity coefficient B, the elasticity coefficient K, and the constant term $\text{Const}_N$ in Eq. (5) as in Eq. (6) with respect to $\hat{\theta}_N$ of Eq. (1) and Eq. (2).

[Math. 6]

$$\hat{\theta}_N = [\hat{M}_N \ \hat{B}_N \ \hat{K}_N \ \hat{\text{Const}}_N]^T \tag{6}$$

Here, $\hat{M}_N$ denotes an estimate of an $N^{th}$ inertia coefficient. $\hat{B}_N$ denotes an estimate of an $N^{th}$ viscosity coefficient. $\hat{K}_N$ denotes an estimate of an $N^{th}$ elasticity coefficient. $\hat{\text{Const}}_N$ denotes an $N^{th}$ constant term.

The physical property data generator 622 applies the angular acceleration $s^2\Theta N$, the angular velocity $s\Theta_N$, the angle $\Theta_N$, and the reaction torque $T_{ext\ N}$ as in Eqs. (7) and (8) with respect to Eqs. (2) to (4).

[Math. 7]

$$z_N = [s^2\Theta_N \ s\Theta_N \Theta N \ 1]^T \tag{7}$$

[Math. 8]

$$y_N = T_{ext\ N} \tag{8}$$

$\rho_N$ in Eq. (9) denotes a forgetting coefficient. The forgetting coefficient can take a value from 0 to 1, but is often used as a constant value from 0.97 to 0.999.

[Math. 9]

$$\rho_N = 0.97 \sim 0.999 \tag{9}$$

Initial conditions of the recursive least squares algorithm are expressed as in Eqs. (10) and (11).

[Math. 10]

$$\hat{\theta}_0 = [0\ 0\ 0\ 0]^T \tag{10}$$

[Math. 11]

$$P_0 = \begin{bmatrix} \alpha & 0 & 0 & 0 \\ 0 & \alpha & 0 & 0 \\ 0 & 0 & \alpha & 0 \\ 0 & 0 & 0 & \alpha \end{bmatrix} \tag{11}$$

$\alpha = 10^3 \sim 10^5$

In this manner, the physical property data generator 622 acquires the angular acceleration $s^2\Theta_N$, the angular velocity $s\Theta_N$, the angle $\Theta_N$, and the reaction torque $T_{ext\ N}$ as inputs of the process of the recursive least squares algorithm. The physical property data generator 622 calculates the inertia coefficient $\hat{M}_N$, the viscosity coefficient $\hat{B}_N$, and the elasticity coefficient $\hat{K}_N$ as outputs of a processing result of the recursive least squares algorithm. That is, the physical property data generator 622 estimates the inertia coefficient M, the viscosity coefficient B, and the elasticity coefficient K in Eq. (5) by executing the recursive least squares algorithm using the angular acceleration $s^2\Theta_N$, the angular velocity $s\Theta_N$, the angle $\Theta_N$, and the reaction torque $T_{ext\_N}$ as inputs. The physical property data generator 622 may further estimate the constant term Const.

Figure 8:
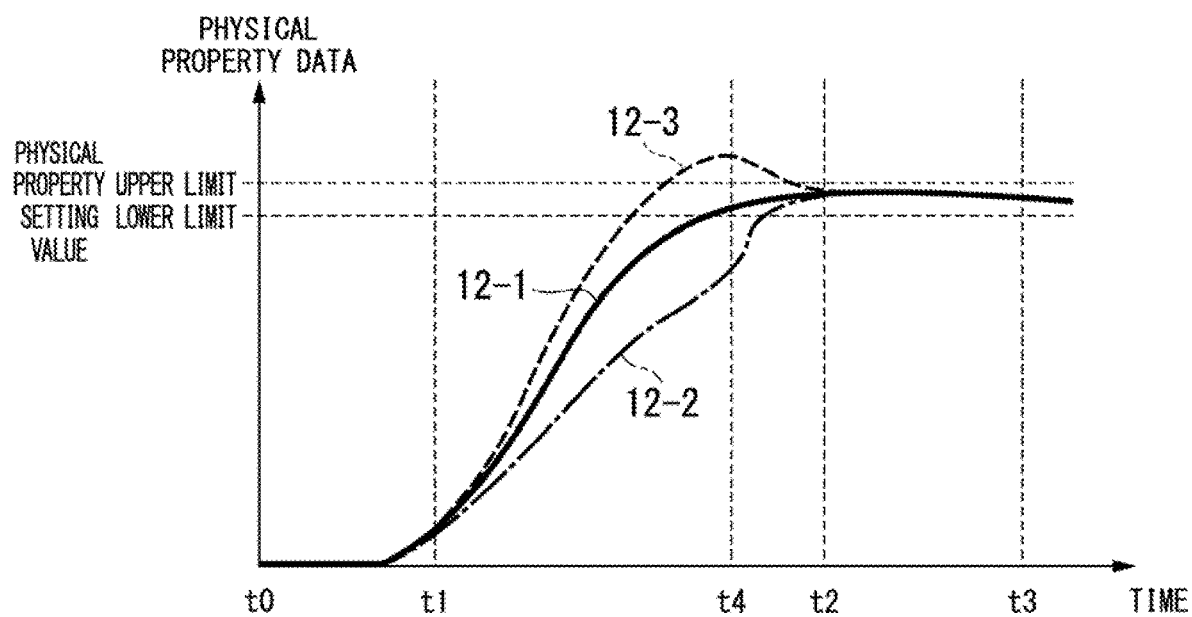
FIG. 8 is a diagram showing an example of a trend graph according to the second embodiment.

FIG. 8 is a diagram showing an example of a trend graph. The horizontal axis represents time. The vertical axis represents physical property data. The controller 72 acquires the physical property data from the data generation device 6 at predetermined time intervals. The controller 72 calculates a difference between the physical property data in a predetermined trend graph (a physical property data curve) and the acquired physical property data at predetermined time intervals. In case that the calculated difference is greater than or equal to a threshold value, the controller 72 generates a control signal so that the calculated difference is reduced.

In FIG. 8, the controller 72 acquires, for example, at least one of inertia data, viscosity data, and elasticity data as the physical property data. For example, the controller 72 calculates a difference between a predetermined physical property curve 12-1 and a physical property curve 12-2 of the acquired physical property data at predetermined time intervals. The controller 72 may calculate a difference between the predetermined physical property curve 12-1 and a physical property curve 12-3 of the acquired physical property data at predetermined time intervals. The controller 72 generates a control signal for changing the rotational velocity of the member 2 at time t4 so that the calculated difference is reduced. Also, the controller 72 may generate a control signal for changing an amount of material or chemical input.

The controller 72 adjusts a parameter value by feeding back a difference to the parameter value included in the control signal so that the difference between the physical property curve 12-1 at the normal time and the physical property curve 12-2 or 12-3 at the abnormal time is reduced.

Thereby, the controller 72 can adjust quality of a product while the product is being manufactured. In FIG. 8, from time t2 after time t4, the controller 72 can cause the value of the physical property data to converge within the range from the upper limit to the lower limit of the physical property setting value. The controller 72 can bring the quality of the product using the object 100 within a standard even if a purchase destination or a production place of the object 100 has changed. i.e., even if physical properties of the object 100 have changed in an initial state.

The controller 72 can prevent a yield rate of products using the object 100 from decreasing.

The controller 72 may draw a calibration curve on a data group of adjustment items, a reaction conversion rate, a freezing point, a softening point, a molecular weight, and the like determined by a manufacturer based on physical quantity data in a trend graph of the physical quantity data, thereby providing a user with useful information.

Next, an example of the operation of the data generation system 1 will be described.

Figure 9:
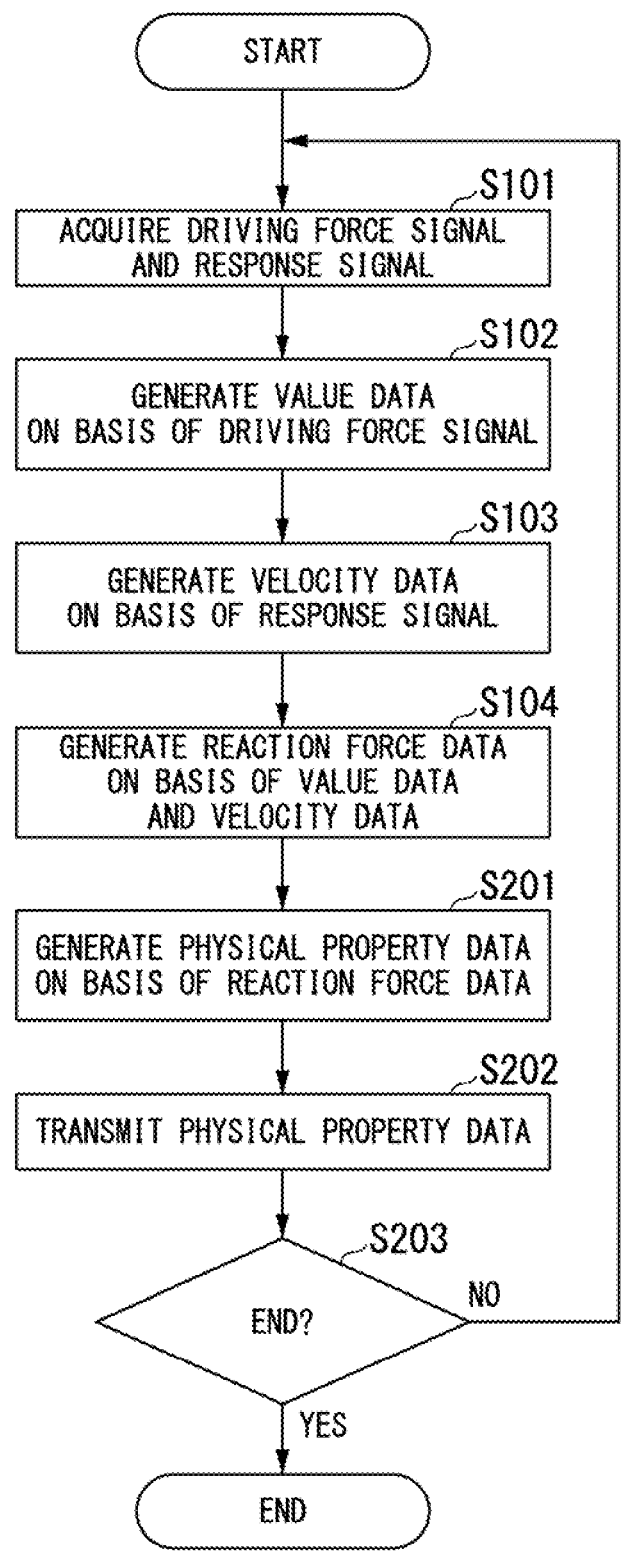
FIG. 9 is a diagram showing an example of an operation of a data generation system according to the second embodiment.

FIG. 9 is a diagram showing an example of the operation of the data generation system 1. The operation from step S101 to step S104 in FIG. 9 is similar to the operation from step S101 to step S104 in FIG. 6. The operation of step S203 in FIG. 9 is similar to the operation of step S106 in FIG. 6.

The physical property data generator 622 generates physical property data of the object 100 based on the reaction force data according to, for example, the recursive least squares algorithm (step S201). The communicator 61 transmits the physical property data to the higher-order control device 7 (step S202). The communicator 61 moves the process to step S203.

As described above, the data generation device 6 of the second embodiment includes the communicator 61, the parameter generator 620, the reaction force data generator 621, and the physical property data generator 622. The parameter generator 620 generates value data based on a driving force signal. The parameter generator 620 generates velocity data based on a response signal. The reaction force data generator 621 generates reaction force data based on the value data and the velocity data with respect to the reaction force received by the member 2 from the object 100. The physical property data generator 622 generates physical property data (for example, inertia data, viscosity data, and elasticity data) of the object 100 based on the reaction force data. The communicator 61 transmits the physical property data to the communicator 71.

Thereby, the data generation device 6 of the second embodiment can generate data of the reaction force received by the member 2 without using a strain gauge. The higher-order control device 7 of the second embodiment can execute control based on physical property data.

The operator of the factory or the like can efficiently perform the process based on the physical property data estimated by the data generation device 6 even if the elapsed time in the process such as stirring is not measured.

Although embodiments of the present invention have been described above in detail with reference to the drawings, specific configurations are not limited to the embodiments and designs and the like may be made without departing from the scope of the present invention.

For example, the data generation device 6 may be provided in the control device 5.

For example, the data generation system 1 may include a hydraulic actuator, a pneumatic actuator (an air cylinder), or a hydraulic actuator instead of including the electric motor 3. In this case, the driving force signal is, for example, a signal representing the pressure of oil, water, or air, a signal representing a valve opening/closing ratio, or a signal representing a differential pressure within the actuator.

For example, the communicator 61 may receive the driving force signal without involving the power supply device 4. As an example, the communicator 61 may directly receive an electric current measurement value regarding the driving of the member 2 from an electric current sensor.

For example, the power supply device 4 and the control device 5 may be integrated.

For example, physical quantity data such as a temperature, a pressure, or a flow rate acquired from various types of sensors 110 may be directly input to the higher-order control device 7 without involving the control device 5.

REFERENCE SIGNS LIST

1 Data generation system
2 Member
3 Electric motor
4 Power supply device
5 Control device
6 Data generation device
7 Higher-order control device
10 Temperature curve
11 Reaction force curve
12 Physical property curve
60 Storage
61 Communicator 62 Generator
70 Storage
71 Communicator
72 Controller
73 Display
100 Object
110 Various types of sensors
620 Parameter generator
621 Reaction force data generator
622 Physical property data generator

The invention claimed is:

1. A data generation device comprising:
a parameter generator configured to generate value data based on a signal having a correlation with a driving force and generate velocity data based on a signal representing a response of a member driven by the driving force;
a reaction force data generator configured to generate data of a reaction force received by the member from an object based on the value data and the velocity data; and
a physical property data generator configured to generate physical property data of the object by executing a recursive least squares algorithm based on the velocity data, acceleration data generated based on the signal representing the response, position data generated based on the signal representing the response, and the data of the reaction force.

2. The data generation device according to claim 1, wherein the physical property data includes any one of an inertia coefficient, a viscosity coefficient, and an elasticity coefficient related to the object.

3. The data generation device according to claim 1, wherein the value data is electric current value data.

4. The data generation device according to claim 1, wherein the velocity data is angular velocity data.

5. The data generation device according to claim 1, wherein the member is a rotating shaft, and
wherein the data of the reaction force is data of reaction torque.

6. The data generation device according to claim 1, the data generation device comprising:
a first storage configured to store any one of internal interference torque related to the driving force, gravity term torque, and a dynamic friction coefficient as a parameter,
wherein the reaction force data generator is configured to generate the data of the reaction force based on the value data, a parameter read from the first storage, and the velocity data.

7. The data generation device according to claim 6, the data generation device comprising:
a second storage configured to store an observer gain of the reaction force data generator,
wherein the reaction force data generator is configured to derive a first result by multiplying the value data by a torque constant related to the driving force,
derive a second result by multiplying the first result by an inertia moment of the member and the observer gain,
derive a fourth result by subtracting a third result derived based on the parameter from a result of a sum of the first result and the second result,
derive a fifth result by applying a low-pass filter to the fourth result, and
derive the data of the reaction force by subtracting the second result from the fifth result.

8. The data generation device according to claim 1, wherein the parameter generator is configured to derive the velocity data by integrating values obtained by subtracting load torque received by the driving force from values obtained by multiplying the value data by a torque constant related to the driving force.

9. The data generation device according to claim 1, wherein the data generation device is configured to transmit the data of the reaction force to a higher-order control device including a controller configured to execute control based on the data of the reaction force.

10. A data generation system comprising a data generation device for generating data and a higher-order control device,
wherein the data generation device comprise:
a parameter generator configured to generate value data based on a signal having a correlation with a driving force and generate velocity data based on a signal representing a response of a member driven by the driving force;
a reaction force data generator configured to generate data of a reaction force received by the member from an object based on the value data and the velocity data; and
a first communicator configured to transmit the data of the reaction force,
wherein the higher-order control device comprise:
a second communicator configured to receive the data of the reaction force; and
a controller configured to execute control based on the received data of the reaction force, and
wherein the controller is configured to output a control signal for stopping the driving force in case that the data of the reaction force converges within a range from a predetermined upper limit to a lower limit.

11. The data generation system according to claim 10, the data generation system comprising:
a first storage configured to store any one of internal interference torque related to the driving force, gravity term torque, and a dynamic friction coefficient as a parameter,
wherein the reaction force data generator is configured to generate the data of the reaction force based on the value data, a parameter read from the first storage, and the velocity data.

12. The data generation system according to claim 11, the data generation system comprising:
a second storage configured to store an observer gain of the reaction force data generator,
wherein the reaction force data generator is configured to derive a first result by multiplying the value data by a torque constant related to the driving force,
derive a second result by multiplying the first result by an inertia moment of the member and the observer gain,
derive a fourth result by subtracting a third result derived based on the parameter from a result of a sum of the first result and the second result,
derive a fifth result by applying a low-pass filter to the fourth result, and
derive the data of the reaction force by subtracting the second result from the fifth result.

13. The data generation system according to claim 10, wherein the parameter generator is configured to derive the velocity data by integrating values obtained by subtracting load torque received by the driving force from values obtained by multiplying the value data by a torque constant related to the driving force.

14. The data generation system according to claim 10, wherein the data generation device further comprises:

a physical property data generator configured to generate physical property data of the object based on the data of the reaction force, wherein the first communicator is configured to transmit the physical property data, wherein the second communicator is configured to receive the physical property data, and wherein the controller is configured to execute control based on the received physical property data.

15. The data generation system according to claim 14, wherein the controller is configured to output a control signal for controlling the driving force so that a difference between the received physical property data and predetermined physical property data is reduced.

16. The data generation system according to claim 14, wherein the physical property data generator is configured to generate the physical property data by executing a recursive least squares algorithm based on the velocity data, acceleration data generated based on the signal representing the response of a member driven by the driving force, position data generated based on the signal representing the response of a member driven by the driving force, and the data of the reaction force.

17. The data generation system according to claim 14, wherein the physical property data includes any one of an inertia coefficient, a viscosity coefficient, and an elasticity coefficient related to the object.

18. A data generation system comprising:

a data generation device configured to generate data; and a higher-order control device configured to control a member for progressing a reaction in which physical properties of an object change based on the data generated by the data generation device, wherein the data generation device comprises:

a parameter generator configured to generate value data based on a signal having a correlation with a driving force and generate velocity data based on a signal representing a response of the member driven by the driving force;

a reaction force data generator configured to generate data of a reaction force received by the member from the object based on the value data and the velocity data; and a first communicator configured to transmit the data of the reaction force, and wherein the higher-order control device comprises:

a second communicator configured to receive the data of the reaction force; and a controller configured to end control of the member by determining that physical properties of the object have been stable in case that the data of the received reaction force converges within a range from a predetermined upper limit to a lower limit of a predetermined reaction force setting value.

* * * * *